US012679087B2

(12) United States Patent
Furuzawa

(10) Patent No.: US 12,679,087 B2
(45) Date of Patent: Jul. 14, 2026

(54) LIQUID DISCHARGE HEAD, DISCHARGE HEAD STRUCTURE, AND RECORDING DEVICE

(71) Applicant: KYOCERA CORPORATION, Kyoto (JP)

(72) Inventor: Daiki Furuzawa, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 167 days.

(21) Appl. No.: 18/552,901

(22) PCT Filed: Mar. 30, 2022

(86) PCT No.: PCT/JP2022/016097

§ 371 (c)(1),
(2) Date: Sep. 28, 2023

(87) PCT Pub. No.: WO2022/210915

PCT Pub. Date: Oct. 6, 2022

(65) Prior Publication Data

US 2024/0181775 A1 Jun. 6, 2024

(30) Foreign Application Priority Data

Mar. 30, 2021 (JP) ................................ 2021-058345

(51) Int. Cl.
*B41J 2/14* (2006.01)
*B41J 2/175* (2006.01)

(52) U.S. Cl.
CPC ............. *B41J 2/1408* (2013.01); *B41J 2/175* (2013.01); *B41J 2202/08* (2013.01)

(58) Field of Classification Search
CPC ... B41J 2/14; B41J 2/1408; B41J 2/175; B41J 2/18; B41J 2202/08; B41J 2202/20; B41J 2202/21
See application file for complete search history.

(56) References Cited

U.S. PATENT DOCUMENTS

2011/0316935 A1 12/2011 Sato et al.
2021/0053347 A1 2/2021 Kobayashi
2022/0258467 A1* 8/2022 Fukuda .................. B41J 2/1408

FOREIGN PATENT DOCUMENTS

EP 2221180 * 12/2015 .............. B41J 2/045
JP 2010-105377 A 5/2010
JP 2014195954 A 10/2014
JP 2016150793 A 8/2016
JP 2017-100286 A 6/2017
(Continued)

OTHER PUBLICATIONS

International Search Report in PCT Application No. PCT/JP2022/016097 mailed Jun. 14, 2022, 2pp.

*Primary Examiner* — Anh T Vo
(74) *Attorney, Agent, or Firm* — HAUPTMAN HAM, LLP

(57) ABSTRACT

A liquid discharge head includes a heat dissipation plate, a head body, a supply pipe, and a shielding portion. The heat dissipation plate is in contact with a heat generation source. The head body includes a discharge hole configured to discharge a liquid. The supply pipe supplies a liquid to the head body. The shielding portion is provided between the heat dissipation plate and the supply pipe and is separated from the heat dissipation plate and the supply pipe.

17 Claims, 6 Drawing Sheets

(56) References Cited

FOREIGN PATENT DOCUMENTS

| | | | |
|---|---|---|---|
| JP | 2019136891 | A | 8/2019 |
| JP | 2020-044799 | A | 3/2020 |
| WO | 2019188969 | A1 | 10/2019 |

* cited by examiner

LIQUID DISCHARGE HEAD, DISCHARGE HEAD STRUCTURE, AND RECORDING DEVICE

CROSS-REFERENCE TO RELATED APPLICATIONS

This application is national stage application of International Application No. PCT/JP2022/016097, filed on Mar. 30, 2022, which designates the United States, and which claims the benefit of priority from Japanese Patent Application No. 2021-058345, filed on Mar. 30, 2021.

TECHNICAL FIELD

The disclosed embodiment relates to a liquid discharge head, a discharge head structure, and a recording device.

BACKGROUND OF INVENTION

Inkjet printers and inkjet plotters utilizing an inkjet recording method are known as printing apparatuses. A liquid discharge head for discharging a liquid is mounted in the printing apparatus using such an inkjet method.

A known liquid discharge head includes a liquid discharge head in which a housing is brought into contact with a drive IC which is a heat generation source and heat transmitted from the drive IC is radiated through the housing (for example, see Patent Document 1).

CITATION LIST

Patent Literature

Patent Document 1: JP 2014-195954 A

SUMMARY

In one aspect of an embodiment, a liquid discharge head includes a heat dissipation plate, a head body, a supply pipe, and a shielding portion. The heat dissipation plate is in contact with the heat generation source. The head body includes a discharge hole configured to discharge a liquid. The supply pipe is configured to supply the liquid to the head body. The shielding portion is provided between the heat dissipation plate and the supply pipe, and is separated from the heat dissipation plate and the supply pipe.

DESCRIPTION OF EMBODIMENTS

Embodiments of a liquid discharge head, a discharge head structure, and a recording device disclosed in the present application will be described in detail below with reference to the accompanying drawings. The present invention is not limited by the following embodiments.

Printer Configuration

Figure 1:
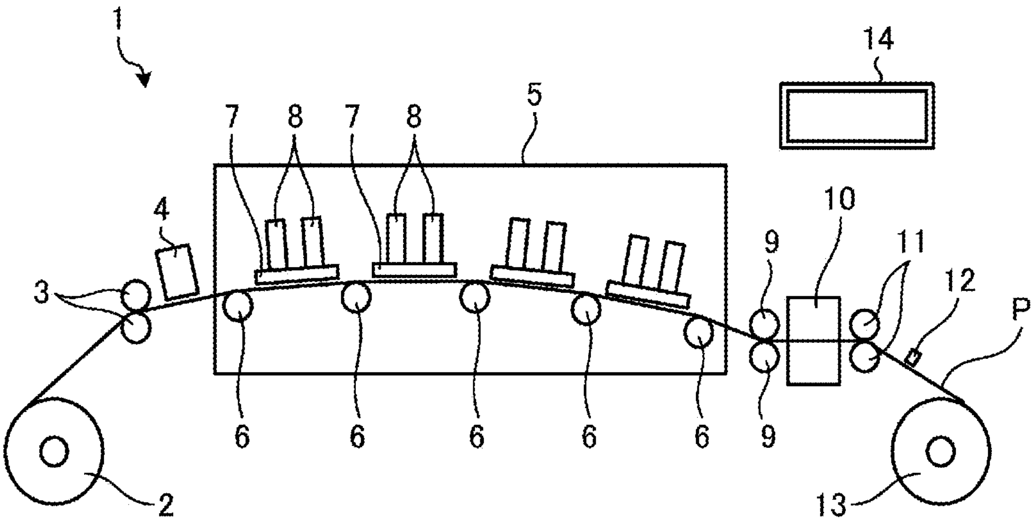
FIG. 1 is an explanatory view (1) of a recording device according to an embodiment.
Figure 2:
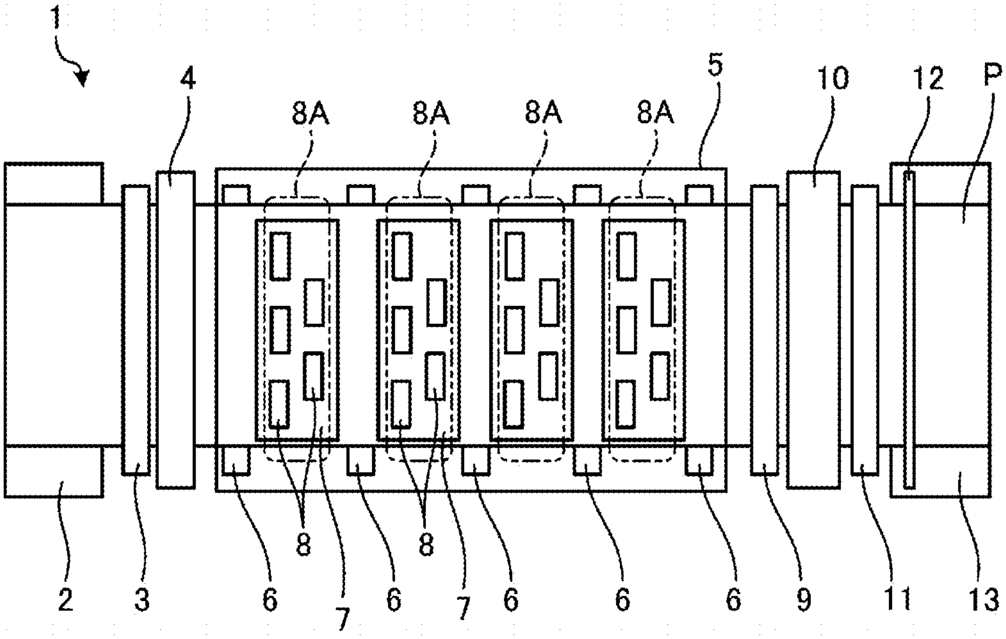
FIG. 2 is an explanatory view (2) of the recording device according to the embodiment.

First, with reference to FIG. 1 and FIG. 2, a description will be given of an overview of a printer 1 serving as an example of a recording device according to an embodiment. FIGS. 1 and 2 are explanatory views of a printer according to the embodiment. Specifically, FIG. 1 is a schematic side view of the printer 1 and FIG. 2 is a schematic plan view of the printer 1. The printer 1 according to the embodiment is, for example, a color inkjet printer.

As illustrated in FIG. 1, the printer 1 includes a paper feed roller 2, guide rollers 3, an applicator 4, a head case 5, a plurality of transport rollers 6, a plurality of frames 7, a plurality of liquid discharge heads 8, transport rollers 9, a dryer 10, transport rollers 11, a sensor portion 12, and a collection roller 13. The transport rollers 6 are examples of a transport portion.

The printer 1 includes a controller 14 that controls the paper feed roller 2, the guide rollers 3, the applicator 4, the head case 5, the plurality of transport rollers 6, the plurality of frames 7, the plurality of liquid discharge heads 8, the transport rollers 9, the dryer 10, the transport rollers 11, the sensor portion 12, and the collection roller 13.

By landing droplets on a printing sheet P, the printer 1 records images and characters on the printing sheet P. The printing sheet P is an example of a recording medium. The printing sheet P is rolled on the paper feed roller 2 prior to use. In this state, the printer 1 conveys the printing sheet P from the paper feed roller 2 to the inside of the head case 5 via the guide rollers 3 and the applicator 4.

The applicator 4 uniformly applies a coating agent to the printing sheet P. With surface treatment thus performed on the printing sheet P, the printing quality of the printer 1 can be improved.

The head case 5 houses the plurality of transport rollers 6, the plurality of frames 7, and the plurality of liquid discharge heads 8. The inside of the head case 5 is formed with a space separated from the outside except for a part connected to the outside such as parts where the printing sheet P enters and exits.

As required, the controller 14 controls at least one selected from the group of controllable factors of the internal space, the group consisting of the head case 5, such as temperature, humidity, and air pressure. The transport rollers

6 convey the printing sheet P to the vicinity of the liquid discharge heads 8, inside the head case 5.

The frames 7 are rectangular flat plates, and are positioned above and close to the printing sheet P conveyed by the transport rollers 6. As illustrated in FIG. 2, the frames 7 are positioned such that the longitudinal direction of the frames 7 is orthogonal to the conveyance direction of the printing sheet P. Furthermore, the plurality of (e.g., four) frames 7 are located inside the head case 5 along the conveyance direction of the printing sheet P.

A liquid, for example, ink, is supplied to the liquid discharge heads 8 from a liquid tank (not illustrated). The liquid discharge heads 8 discharge the liquid supplied from the liquid tank.

The controller 14 controls the liquid discharge heads 8 based on data of an image, characters, or the like to discharge the liquid toward the printing sheet P. The distance between each liquid discharge head 8 and the printing sheet P is, for example, approximately 0.5 mm to 20 mm.

Each of the liquid discharge heads 8 is fixed to the frame 7. The liquid discharge heads 8 are positioned such that the longitudinal direction of the liquid discharge heads 8 is orthogonal to the conveyance direction of the printing sheet P.

That is, the printer 1 according to the embodiment is a so-called line printer in which the liquid discharge heads 8 are fixed inside the printer 1. Note that the printer 1 according to the embodiment is not limited to a line printer and may also be a so-called serial printer.

The serial printer is a printer employing a method of alternately performing operations of recording while moving the liquid discharge heads 8 in a manner such as reciprocation in a direction intersecting (e.g., substantially orthogonal to) the conveyance direction of the printing sheet P, and conveying the printing sheet P.

As illustrated in FIG. 2, a plurality of (e.g., five) liquid discharge heads 8 are fixed to one frame 7. FIG. 2 illustrates an example in which three liquid discharge heads 8 are located on the forward side and two liquid discharge heads 8 are located on the rear side, in the conveyance direction of the printing sheet P. Further, the liquid discharge heads 8 are positioned without their centers overlapping in the conveyance direction of the printing sheet.

The plurality of liquid discharge heads 8 positioned in one frame 7 form a head group 8A. Four head groups 8A are positioned along the conveyance direction of the printing sheet P. The liquid discharge heads 8 belonging to the same head group 8A are supplied with ink of the same color. As a result, the printer 1 can perform printing with four colors of ink using the four head groups 8A.

The colors of the ink discharged from the respective head groups 8A are, for example, magenta (M), yellow (Y), cyan (C), and black (K). The controller 14 can print a color image on the printing sheet P by controlling the respective head groups 8A to discharge the plurality of colors of ink onto the printing sheet P.

Note that a surface treatment may be performed on the printing sheet P, by discharging a coating agent from the liquid discharge head 8 onto the printing sheet P.

Furthermore, the number of the liquid discharge heads 8 included in one head group 8A and the number of the head groups 8A mounted in the printer 1 can be changed as appropriate in accordance with printing targets and printing conditions. For example, if the color to be printed on the printing sheet P is a single color and the range of the printing can be covered by a single liquid discharge head 8, only a single liquid discharge head 8 may be provided in the printer 1.

The printing sheet P thus subjected to the printing process inside the head case 5 is conveyed by the transport rollers 9 to the outside of the head case 5, and passes through the inside of the dryer 10. The dryer 10 dries the printing sheet P after the printing process. The printing sheet P thus dried by the dryer 10 is conveyed by the transport rollers 11 and then collected by the collection roller 13.

In the printer 1, by drying the printing sheet P with the dryer 10, it makes it possible to suppress bonding, or rubbing of an undried liquid, between the printing sheets P overlapped with each other and rolled at the collection roller 13.

The sensor portion 12 includes a position sensor, a speed sensor, or a temperature sensor. Based on information from the sensor portion 12, the controller 14 can determine the state of each part of the printer 1 and control each part of the printer 1.

In the printer 1 described above, the printing sheet P is the printing target (i.e., the recording medium), but the printing target in the printer 1 is not limited to the printing sheet P, and a roll type fabric or the like may be the printing target.

Furthermore, instead of directly conveying the printing paper P, the printer 1 may have a configuration in which the printing sheet P is put on a conveyor belt and conveyed. By using the conveyor belt, the printer 1 can perform printing on a sheet of paper, a cut cloth, wood, a tile, or the like as a printing target.

Furthermore, the printer 1 may discharge a liquid containing electrically conductive particles from the liquid discharge heads 8, to print a wiring pattern or the like of an electronic device. Furthermore, the printer 1 may discharge a liquid containing a predetermined amount of a liquid chemical agent or a liquid containing the chemical agent from the liquid discharge heads 8 onto a reaction vessel or the like to produce chemicals.

The printer 1 may also include a cleaner for cleaning the liquid discharge heads 8. The cleaner cleans the liquid discharge heads 8 by, for example, a wiping process or a capping process.

The wiping process is, for example, a process of wiping a surface of a portion from which a liquid is discharged using a flexible wiper, thereby removing the liquid attached to the liquid discharge head 8.

The capping process is performed as follows, for example. First, a cap is provided to cover a nozzle surface 23*a* of a channel member 23 (see FIG. 4) where the discharge hole is located, which is an example of the portion from which the liquid is discharged (this process is referred to as capping). As a result, a substantially sealed space is formed between the nozzle surface 23*a* and the cap.

The discharge of the liquid is then repeated in such a sealed space. Consequently, this enables removing the liquid having a viscosity greater than that in the normal state, foreign matter, or the like that has clogged the discharge hole located in the nozzle surface 23*a* (see FIG. 4).

Configuration of Liquid Discharge Head

Figure 3:
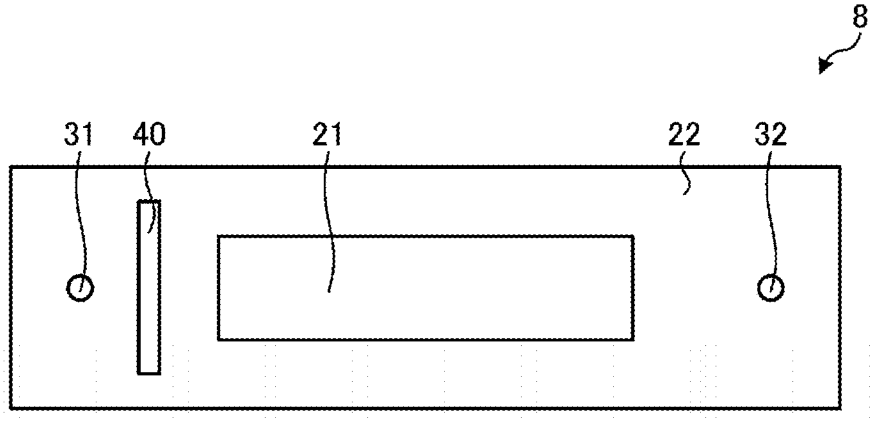
FIG. 3 is a plan view illustrating a configuration of a main portion of a liquid discharge head according to the embodiment.
Figure 4:
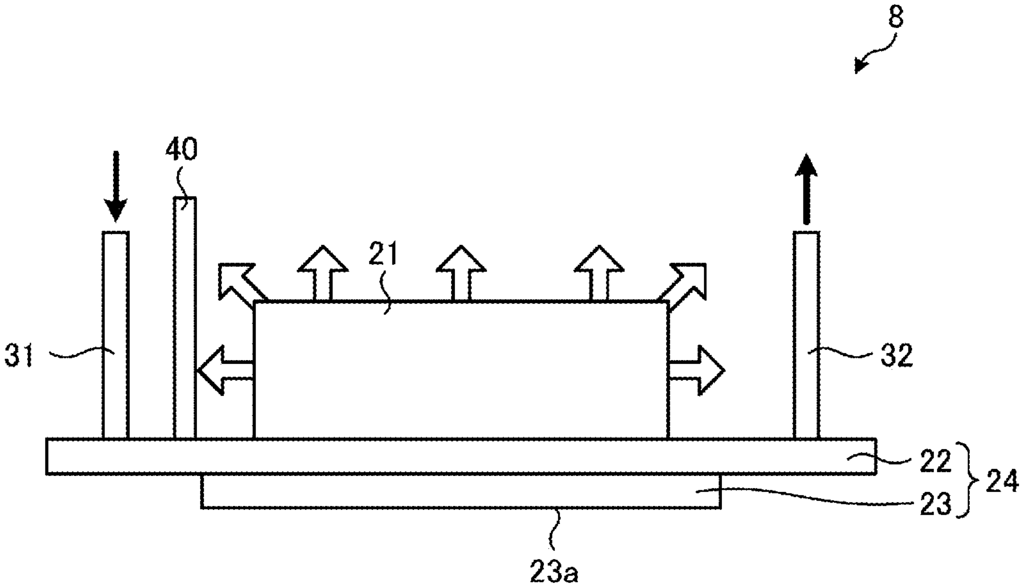
FIG. 4 is a side view illustrating the liquid discharge head illustrated in FIG. 3.

The configuration of the liquid discharge head 8 according to the embodiment will be described with reference to FIGS. 3 and 4. FIG. 3 is a plan view illustrating the configuration of the main portion of the liquid discharge head according to the embodiment. FIG. 4 is a side view illustrating the liquid discharge head illustrated in FIG. 3.

The liquid discharge head 8 includes a heat dissipation plate 21, a head body 24, a supply pipe 31, a recovery pipe 32, and a shielding portion 40. The head body 24 includes a reservoir 22 and a channel member 23.

Note that, in the following description, for the purpose of convenience and clarity of explanation, a direction in which the reservoir 22 of the head body 24 is provided in the liquid discharge head 8 may be referred to as "upward," and a direction in which the channel member 23 is provided relative to the reservoir 22 may be referred to as "downward". FIGS. 3 and 4 illustrate shapes of the members in a simplified manner.

A heat dissipation plate 21 has a box shape with an open lower surface. The heat dissipation plate 21 is in contact with a heat generation source. The heat dissipation plate 21 dissipates heat transferred from the heat generation source to the surroundings. The material of the heat dissipation plate 21 is, for example, aluminum whose surface is anodized. The heat dissipation plate 21 may use a plurality of plate-like members.

The heat generation source is, for example, one or more ICs (not illustrated) configured to control driving of the head body 24. The heat generation source is in contact with, for example, a side surface of the heat dissipation plate 21. The heat generation source may be in contact with the upper surface or the lower surface of the heat dissipation plate 21. Note that, the heat generation source may be in contact with the side surface or another surface of the heat dissipation plate 21 via a member such as thermally conductive grease. At least a part of the heat generation source may be in contact with the heat dissipation plate 21.

The reservoir 22 includes a channel therein, and is supplied with a liquid from the outside through the supply pipe 31. The reservoir 22 has a function of supplying a liquid to the channel member 23 and a function of storing a liquid to be supplied to the channel member 23.

The channel member 23 has a substantially flat plate shape, and a liquid is supplied from the reservoir 22 to the inner portion of the channel member 23. The channel member 23 includes the nozzle surface 23*a* separated from the reservoirs 22. A plurality of discharge holes configured to discharge a liquid onto the printing sheet P are located in the nozzle surface 23*a*. A channel through which a liquid flows from the reservoir 22 side to the nozzle surface 23*a* side is located inside the channel member 23.

The supply pipe 31 is connected to an opening (not illustrated) located on one end side of the reservoir 22 in the longitudinal direction. The supply pipe 31 supplies a liquid into the reservoir 22. The material of the supply pipe 31 is, for example, polypropylene or another resin.

The recovery pipe 32 is connected to an opening (not illustrated) located on the other end side of the reservoir 22 in the longitudinal direction. The recovery pipe 32 recovers the liquid from the inner portion of the reservoir 22.

The shielding portion 40 is separated from the heat dissipation plate 21. The shielding portion 40 is fixed to the reservoir 22 by, for example, screwing using an L-shaped fixing member (not illustrated) as necessary. The material of the shielding portion 40 is, for example, aluminum or stainless steel. The shielding portion 40 absorbs a part of the heat radiated from the heat dissipation plate 21. The shielding portion 40 is provided between the heat dissipation plate 21 and the supply pipe 31. Since the heat radiated from the heat radiation plate 21 is blocked by the shielding portion 40, the heat is less likely to be transmitted to the supply pipe 31.

Since the shielding portion 40 is separated from the supply pipe 31, the heat absorbed by the shielding portion 40 is less likely to be transmitted to the supply pipe 31. Thus, the liquid flowing through the supply pipe 31 is stably supplied into the reservoir 22 at a desired appropriate temperature. As a result, the liquid discharge head 8 can stably discharge a liquid from the nozzle surface 23*a*.

Note that, the shielding portion 40 may have an emissivity less than that of the heat dissipation plate 21. Accordingly, the heat absorbed by the shielding portion 40 is less likely to be radiated to the periphery of the shielding portion 40, thereby moderating the radiation of the heat absorbed by the shielding portion 40. Therefore, the liquid flowing through the supply pipe 31 is stably supplied into the reservoir 22 at a desired appropriate temperature. As a result, the liquid discharge head 8 can stably discharge a liquid from the nozzle surface 23*a*. Note that, the emissivities of the shielding portion 40 and the heat dissipation plate 21 can be measured in accordance with JIS A1423:2017.

On the other hand, a shielding portion corresponding to the shielding portion 40 may not be located between the heat dissipation plate 21 and the recovery pipe 32. Thus, the heat transferred to the heat dissipation plate 21 can be quickly released to the recovery pipe 32, and the heat can be radiated from the heat dissipation plate 21 and the heat generation source.

The height of the shielding portion 40 from the head body 24 is higher than the height of the heat dissipation plate 21 from the head body 24. As a result, the heat radiated from the heat dissipation plate 21 can be blocked by the shielding portion 40. Therefore, the heat radiated from the heat dissipation plate 21 is less likely to be supplied to the supply pipe 31.

Various Variations

Figure 5:
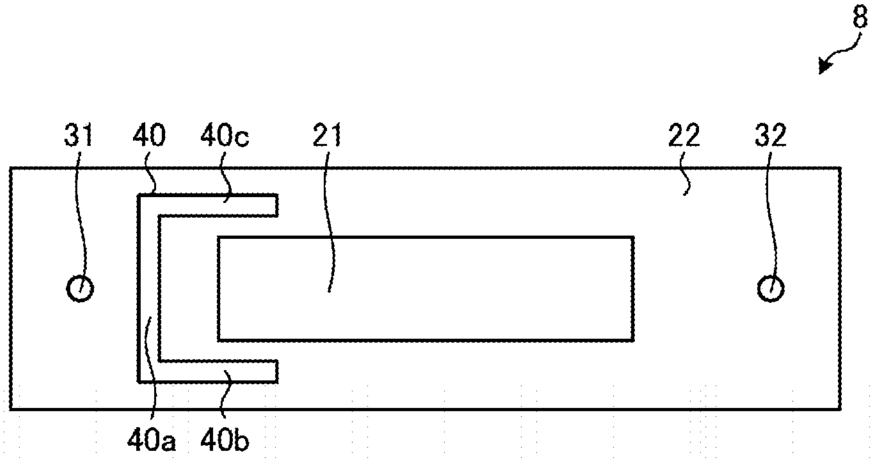
FIG. 5 is a plan view illustrating a configuration of a main portion of a liquid discharge head according to a first variation of the embodiment.
Figure 6:
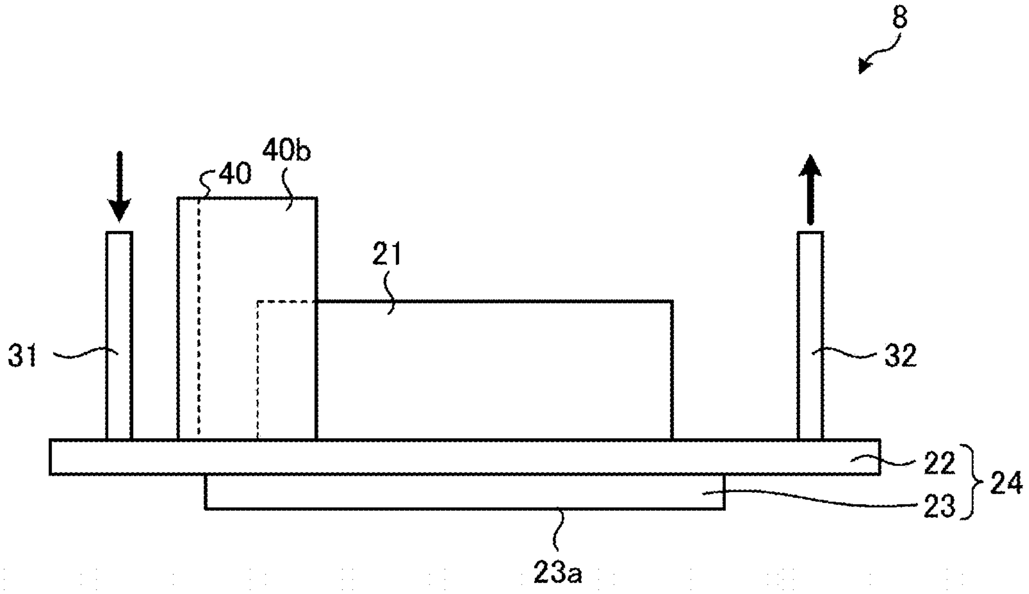
FIG. 6 is a side view of the liquid discharge head illustrated in FIG. 5.

Various variations of the liquid discharge head 8 according to the embodiment will be described with reference to FIGS. 5 to 12. FIG. 5 is a plan view illustrating the configuration of the main portion of the liquid discharge head according to the first variation of the embodiment. FIG. 6 is a side view of the liquid discharge head illustrated in FIG. 5. Note that, in the various variations below, redundant explanations are omitted, with parts that are the same as those in the embodiment described above denoted by the same reference numerals.

As illustrated in FIGS. 5 and 6, the shielding portion 40 is different from the liquid discharge head 8 according to the embodiment in that the shielding portion 40 is bent in a plan view. As illustrated in FIG. 5, the shielding portion 40 includes a first portion 40*a*, a second portion 40*b*, and a third portion 40*c*.

The first portion 40*a* is located between the heat dissipation plate 21 and the supply pipe 31 and extends in the lateral direction of the reservoirs 22. The second portion 40*b* and the third portion 40*c* respectively extend in the longitudinal direction of the reservoir 22 from both ends of the first portion 40*a* extending in the lateral direction of the reservoir 22. The shielding portion 40 is located to surround the heat dissipation plate 21 in plan view.

By locating the shielding portion 40 which surrounds the heat dissipation plate 21 in a plan view, the effect of shielding the heat radiated from the heat dissipation plate 21 by the shielding portion 40 is further enhanced. Thus, the liquid flowing through the supply pipe 31 is stably supplied into the reservoir 22 at a desired appropriate temperature. As a result, the liquid discharge head 8 can stably discharge a liquid from the nozzle surface 23*a*. By bending the shielding portion 40 in a plan view, the strength of the shielding portion 40 can be increased.

Note that, although the shielding portion 40 which is bent and surrounds the heat dissipation plate 21 in a plan view has been described in FIGS. 5 and 6, the shielding portion 40 may be curved in a plan view. The shielding portion 40 may be bent or curved and surrounds the supply pipe 31 in a plan view. The first portion 40*a*, the second portion 40*b*, and the third portion 40*c* may have different heights.

Figure 7:
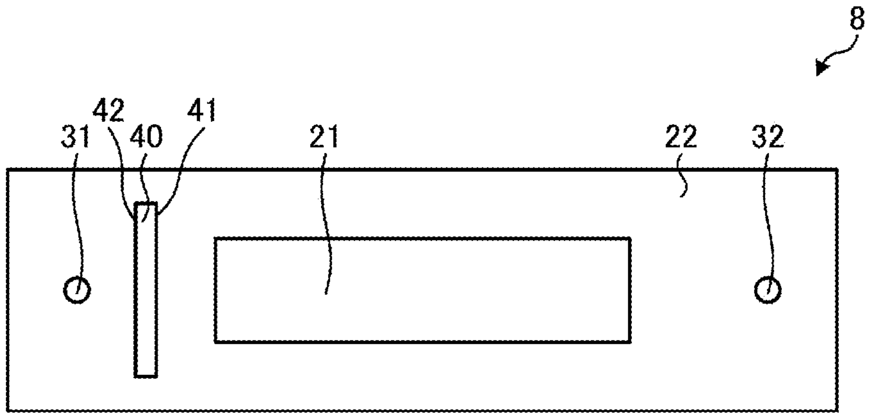
FIG. 7 is a plan view illustrating a configuration of a main portion of a liquid discharge head according to a second variation of the embodiment.

FIG. 7 is a plan view illustrating the configuration of the main portion of the liquid discharge head according to the second variation of the embodiment. In the liquid discharge head 8 illustrated in FIG. 7, the emissivity of the shielding portion 40 is different between a first surface 41 facing the heat dissipation plate 21 and a second surface 42 facing the supply pipe 31. Specifically, the emissivity of the shielding portion 40 is greater at the first surface 41 located on the heat dissipation plate 21 side than at the second surface 42 located on the supply pipe 31 side.

At the first surface 41 having a greater emissivity than the second surface 42, the heat radiated from the heat dissipation plate 21 is likely to be absorbed. On the other hand, at the second surface 42 having a less emissivity than the first surface 41, the heat absorbed from the heat dissipation plate 21 is less likely to be released. Accordingly, the effect of shielding the heat radiated from the heat dissipation plate 21 by the shielding portion 40 is further enhanced, and thus the liquid discharge head 8 can stably discharge the liquid from the nozzle surface 23*a*.

Here, the first surface 41 having a greater emissivity than the second surface 42 is obtained by, for example, roughening or anodizing the first surface 41. The second surface 42 may be smoothed to have a less emissivity than the first surface 41.

Note that, in the shielding portion 40, the emissivity of the first surface 41 located on the heat dissipation plate 21 side may be greater than the emissivity of the heat dissipation plate 21. By setting the emissivity of the first surface 41 to be greater than the emissivity of the heat dissipation plate 21, heat radiated from the heat dissipation plate 21 toward the shielding portion 40 is likely to be absorbed from the first surface 41. At this time, the emissivity of the second surface 42 located on the supply pipe 31 side may be less than the emissivity of the heat dissipation plate 21.

Figure 8:
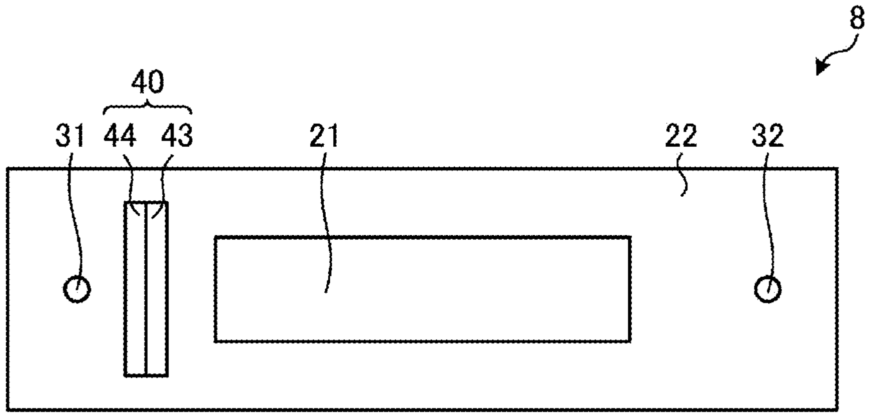
FIG. 8 is a plan view illustrating a configuration of a main portion of a liquid discharge head according to a third variation of the embodiment.

In the example illustrated in FIG. 7, the emissivities are made different by one member, but the shielding portion 40 may be configured by a plurality of members having different emissivities. FIG. 8 is a plan view illustrating the configuration of the main portion of the liquid discharge head according to the third variation of the embodiment.

As illustrated in FIG. 8, the shielding portion 40 includes a first member 43 and a second member 44. The emissivity of the shielding portion 40 is greater at the first member 43 located on the heat dissipation plate 21 side than at the second member 44 located on the supply pipe 31 side. The material of the first member 43 is, for example, aluminum whose surface is anodized, and the material of the second member 44 is, for example, stainless steel or aluminum whose surface is not anodized.

At the first member 43 having a greater emissivity than the second member 44, the heat radiated from the heat dissipation plate 21 is likely to be absorbed. On the other hand, at the second member 44 having a less emissivity than the first member 43, the heat absorbed from the heat dissipation plate 21 is less likely to be released. Accordingly, the effect of shielding the heat radiated from the heat dissipation plate 21 by the shielding portion 40 is further enhanced, and thus the liquid discharge head 8 can stably discharge the liquid from the nozzle surface 23*a*.

Figure 9:
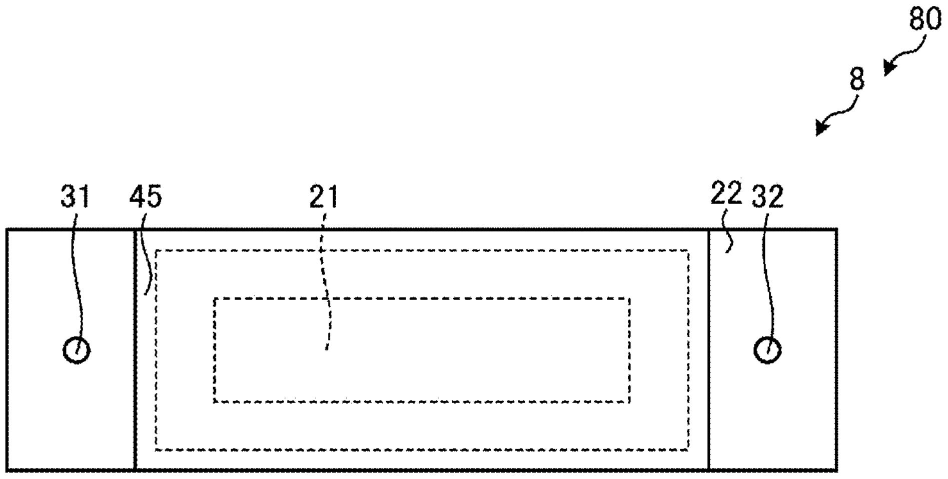
FIG. 9 is a plan view illustrating a configuration of a main portion of a discharge head structure including a liquid discharge head according to a fourth variation of the embodiment.
Figure 10:
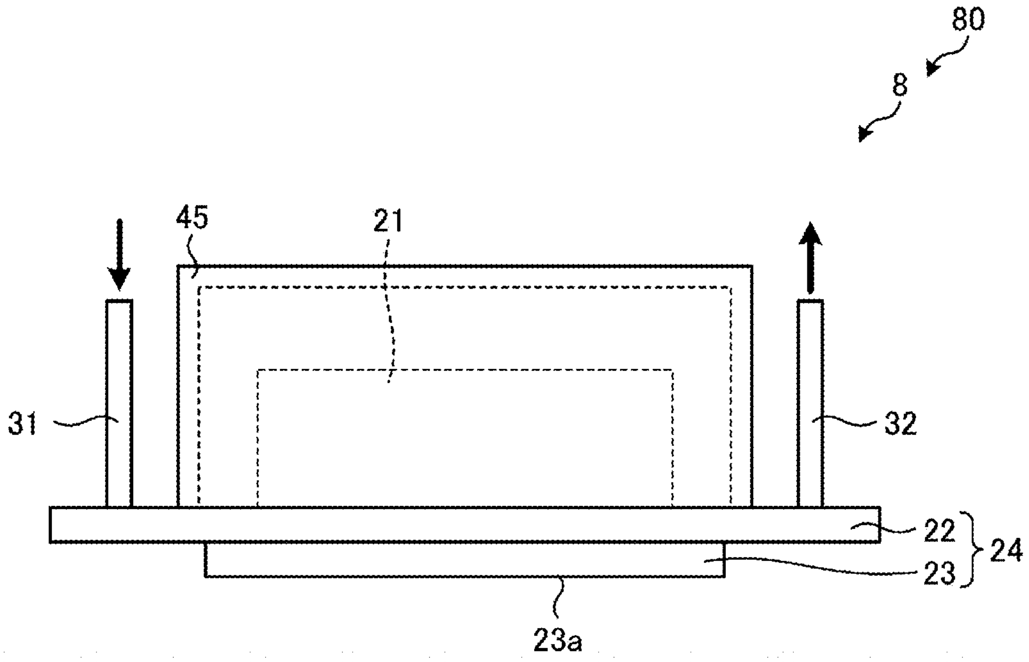
FIG. 10 is a side view of the discharge head structure illustrated in FIG. 9.

FIG. 9 is a plan view illustrating the configuration of the main portion of the discharge head structure including the liquid discharge head according to the fourth variation of the embodiment. FIG. 10 is a side view of the discharge head structure illustrated in FIG. 9.

As illustrated in FIGS. 9 and 10, a discharge head structure 80 includes the liquid discharge head 8 and a box-shaped body 45. The box-shaped body 45 is located on the reservoir 22 and surrounds the heat dissipation plate 21. The material of the box-shaped body 45 is, for example, aluminum or stainless steel.

A portion of the box-shaped body 45 located between the heat dissipation plate 21 and the supply pipe 31 also serves as the shielding portion 40 included in the liquid discharge head 8 according to the embodiment. Since the box-shaped body 45 surrounds the entire heat dissipation plate 21, the effect of shielding the heat radiated from the heat dissipation plate 21 is further enhanced. Accordingly, the discharge head structure 80 can stably discharge the liquid from the nozzle surface 23*a*.

Note that, the emissivity of a portion of the box-shaped body 45 corresponding to the shielding portion 40 included in the liquid discharge head 8 according to the embodiment may be less than the emissivity of the other portions of the box-shaped body 45. As a result, the effect of shielding the heat radiated from the heat dissipation plate 21 can be enhanced at the portion corresponding to the shielding portion 40, while the heat dissipation performance of the box-shaped body 45 can be enhanced at the other portions.

Since the box-shaped body 45 has a box shape, the strength is increased compared to the plate-like shielding portion 40 included in the liquid discharge head 8 according to the embodiment. Note that, although not illustrated in the drawings, instead of the box-shaped body 45, a tubular body having a tubular shape in which the upper side of the heat dissipation plate 21 is open may be located.

Figure 11:
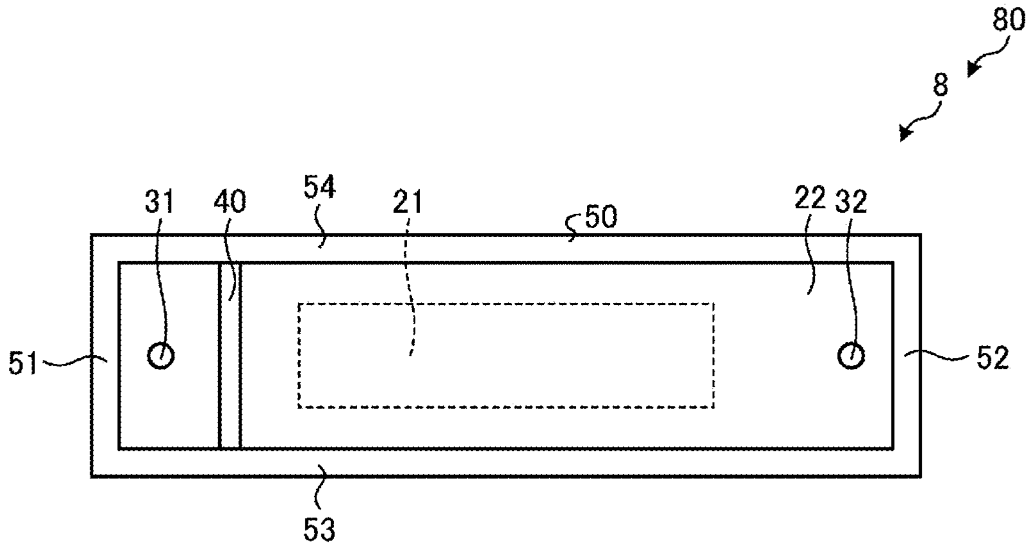
FIG. 11 is a plan view illustrating a structure of a main portion of a discharge head structure including a liquid discharge head according to a fifth variation of the embodiment.
Figure 12:
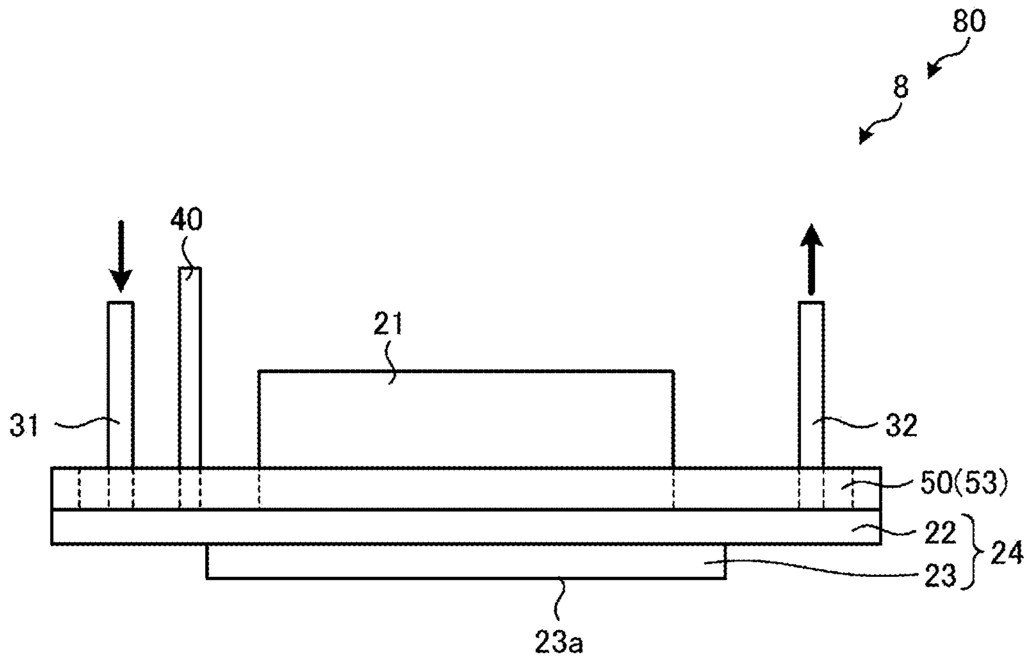
FIG. 12 is a side view of the discharge head structure illustrated in FIG. 11.

FIG. 11 is a plan view illustrating the configuration of the main portion of the discharge head structure including the liquid discharge head according to the fifth variation of the embodiment. FIG. 12 is a side view of the discharge head structure illustrated in FIG. 11.

As illustrated in FIGS. 11 and 12, the discharge head structure 80 includes the liquid discharge head 8 and a frame 50. The frame 50 is located on the reservoir 22 and fixes the liquid discharge head 8 by, for example, screwing. The material of the frame 50 is, for example, stainless steel or aluminum.

The shielding portion 40 also serves as a part of the frame 50. Therefore, the shielding portion 40 can be appropriately located without being fixed to the liquid discharge head 8 by, for example, screwing. This increases the degree of freedom in design of the liquid discharge head 8.

Note that, the frame 50 may be a part of the frame 7 illustrated in FIGS. 1 and 2, or may be a member separate from the frame 7.

Each embodiment according to the present invention was described above. However, the present invention is not limited to the embodiments described above, and various modifications can be made without departing from the essential spirit of the present invention. For example, as the shielding portion 40 included in the discharge head structure 80 illustrated in FIG. 11 and/or FIG. 12, the shielding portion 40 included in the liquid discharge head 8 according to various variations may be applied.

As described above, the liquid discharge head 8 according to the embodiment includes the heat dissipation plate 21, the head body 24, the supply pipe 31, and the shielding portion

40. The heat dissipation plate 21 is in contact with a heat generation source. The head body 24 includes a discharge hole configured to discharge a liquid. The supply pipe 31 supplies a liquid to the head body 24. The shielding portion 40 is provided between the heat dissipation plate 21 and the supply pipe 31 and is separated from the heat dissipation plate 21 and the supply pipe 31. Accordingly, the liquid can be stably discharged.

In addition, the liquid discharge head 8 according to the embodiment further includes the recovery pipe 32 that recovers the liquid from the head body 24, and the shielding portion is not positioned between the heat dissipation plate 21 and the recovery pipe 32. Thus, the heat transferred to the heat dissipation plate 21 can be quickly released.

The shielding portion 40 according to the embodiment is bent or curved in a plan view. Accordingly, the liquid can be stably discharged.

In the liquid discharge head 8 according to the embodiment, the emissivity of the shielding portion 40 is less than the emissivity of the heat dissipation plate 21. This can moderate the radiation of the heat absorbed by the shielding portion 40.

In the liquid discharge head 8 according to the embodiment, the emissivity of the shielding portion 40 is greater on the heat dissipation plate 21 side than on the supply pipe 31 side. Accordingly, the liquid can be stably discharged.

In the liquid discharge head 8 according to the embodiment, the height of the shielding portion 40 from the head body 24 is higher than the height of the heat dissipation plate 21 from the head body 24. Accordingly, the liquid can be stably discharged.

The discharge head structure 80 according to the embodiment includes the heat dissipation plate 21 in contact with the heat generation source, the head body 24 including a discharge hole configured to discharge a liquid, the supply pipe 31 configured to supply the liquid to the head body 24, and the box-shaped body 45 provided between the heat dissipation plate 21 and the supply pipe 31, including the shielding portion separated from the heat dissipation plate 21 and the supply pipe 31, and surrounding the heat dissipation plate 21. Accordingly, the liquid can be stably discharged.

The discharge head structure 80 according to the embodiment includes the liquid discharge head 8 described above and the frame 50 configured to fix the liquid discharge head 8. The shielding portion 40 also serves as a part of the frame 50. This increases the degree of freedom in design of the liquid discharge head 8.

Further effects and variations can be readily derived by those skilled in the art. Thus, a wide variety of aspects of the present disclosure are not limited to the specific details and representative embodiments represented and described above. Accordingly, various changes are possible without departing from the spirit or scope of the general inventive concepts defined by the appended claims and their equivalents.

The invention claimed is:

1. A liquid discharge head comprising:

a heat dissipation plate in contact with a heat generation source;

a head body comprising a discharge hole configured to discharge a liquid;

a supply pipe configured to supply the liquid to the head body; and a shielding portion provided between the heat dissipation plate and the supply pipe and positioned away from an outer surface of the supply pipe.

2. The liquid discharge head according to claim 1, further comprising:

a recovery pipe configured to recover the liquid from the head body, wherein the shielding portion is not located between the heat dissipation plate and the recovery pipe.

3. The liquid discharge head according to claim 1, wherein the shielding portion is bent or curved in a plan view.

4. The liquid discharge head according to claim 1, wherein an emissivity of the shielding portion is less than an emissivity of the heat dissipation plate.

5. The liquid discharge head according to claim 1, wherein an emissivity of the shielding portion is greater on a heat dissipation plate side than on a supply pipe side.

6. The liquid discharge head according to claim 1, wherein a height of the shielding portion from the head body is higher than a height of the heat dissipation plate from the head body.

7. A discharge head structure comprising:

the liquid discharge head according to claim 1; and a frame configured to fix the liquid discharge heat to the frame, wherein the shielding portion is a part of the frame.

8. The liquid discharge head according to claim 1, wherein the shielding portion is positioned away from the heat dissipation plate.

9. The liquid discharge head according to claim 1, wherein the supply pipe is positioned away from the heat dissipation plate.

10. The liquid discharge head according to claim 1, wherein an air layer is located between the outer surface of the supply pipe and an outer surface of the heat dissipation plate.

11. A discharge head structure comprising:

a heat dissipation plate in contact with a heat generation source;

a head body comprising a discharge hole configured to discharge a liquid;

a supply pipe configured to supply the liquid to the head body; and a box-shaped body provided between the heat dissipation plate and the supply pipe, the box-shaped body comprising a shielding portion positioned away from an outer surface of the supply pipe, the box-shaped body surrounding the heat dissipation plate.

12. A recording device comprising:

the liquid discharge head structure according to claim 11; and a transport portion configured to transport a recording medium to the discharge head structure.

13. A recording device comprising:

the discharge head structure according to claim 11; and an applicator configured to apply a coating agent to a recording medium.

14. A recording device comprising:

the discharge head structure according to claim 11; and the discharge head structure according to claim 11; and a dryer configured to dry a recording medium.

15. The liquid discharge head structure according to claim 11, wherein the shielding portion is positioned away from the heat dissipation plate.

16. The liquid discharge head structure according to claim 11, wherein the supply pipe is positioned away from the heat dissipation plate.

17. The liquid discharge head structure according to claim 11, wherein an air layer is located between the outer surface of the supply pipe and an outer surface of the heat dissipation plate.

* * * * *